Jan. 29, 1957     A. LE R. BURKETT     2,779,670
SOIL CONDITIONING AND FERTILIZING COMPOUNDS
AND METHODS OF MANUFACTURE
Filed Oct. 27, 1952
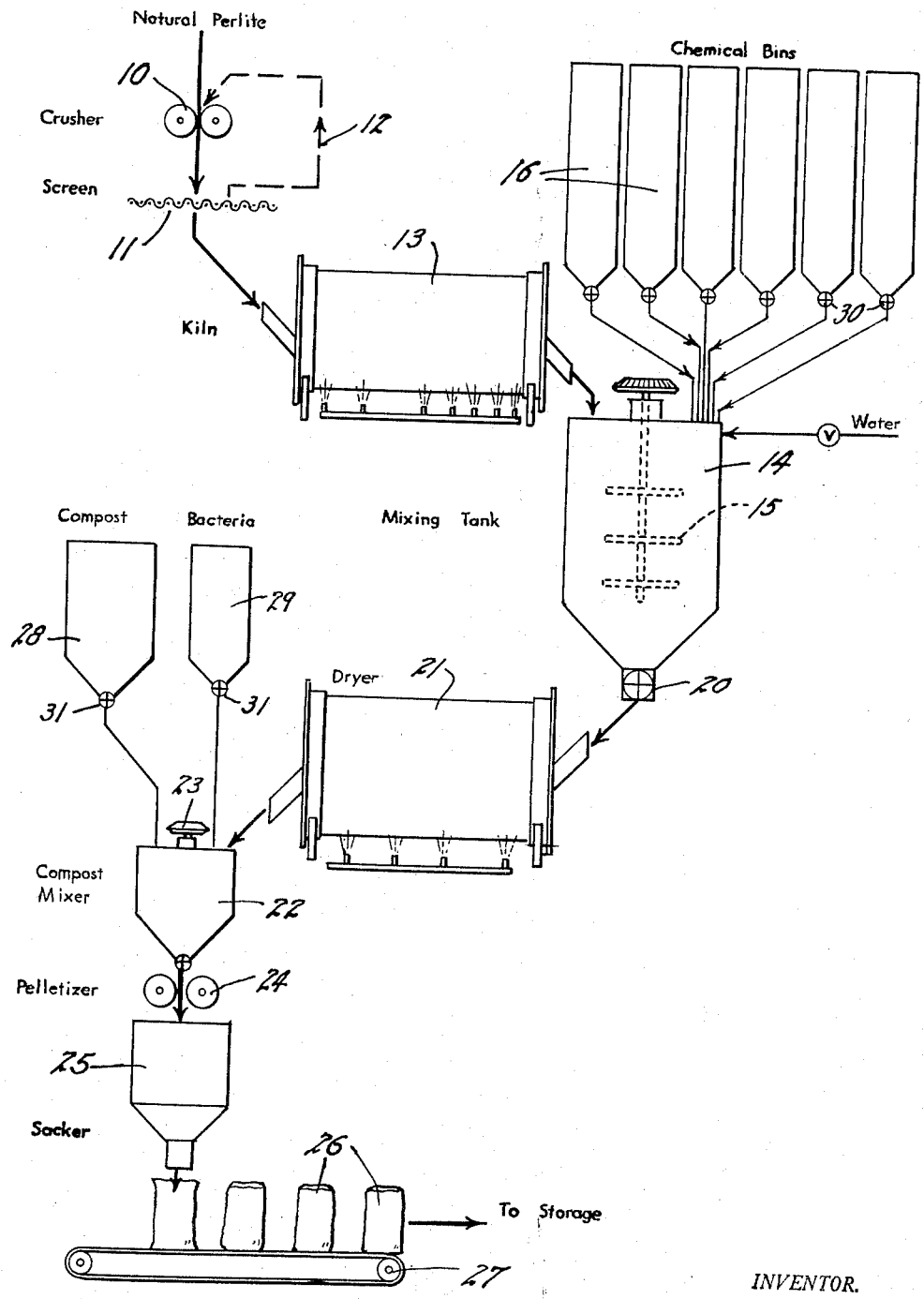
INVENTOR.
ALBERT LEROY BURKETT
BY
ATTORNEY.

2,779,670

SOIL CONDITIONING AND FERTILIZING COMPOUNDS AND METHODS OF MANUFACTURE

Albert Le Roy Burkett, Pueblo, Colo., assignor to Combined Minerals, Inc., Denver, Colo., a corporation of Colorado Application October 27, 1952, Serial No. 317,115

3 Claims. (Cl. 71—64)

This invention relates to an improved soil conditioning and fertilizing compound and to the method of producing the same.

The usual soil fertilizer consists of approximately twenty percent plant food and the remainder inert material of no value to plant life in any way. The plant food is quickly assimilated or washed away so that repeated applications at close intervals are therefore necessary and each application is of successively less value due to the constantly increasing content of inert material accumulating in the soil.

In many conventional fertilizers, the ingredients which are of value are so concentrated in themselves, such as super-phosphates and other unbalanced chemical compounds having a high acid content, that although they give a growing crop a temporary growth acceleration, they tend to destroy the necessary minute plant and animal life in the soil. The soil depends upon this plant life or bacteria and the animal life or earth worms for its fertility, since it is this life that converts the elements in the soil into the soluble salts which can be assimilated by the growing plants, and it is this life that keeps soil in an open, aerated and absorptive condition for the reception and retention of surface moisture.

The principal object of this invention is to provide a soil conditioner which will avoid the above noted objections to the conventional conditioners and fertilizers; in which the necessary plant chemicals will be uniformly distributed throughout the entire content of the soil conditioner; and in which these necessary chemicals will be retained until converted and assimilated by the plants so that fewer applications will be required and a more uniform, accelerated plant growth will be attained.

Another object of the invention is to provide a soil builder and fertilizer in which the inert material, that is, the base or vehicle material which cannot be converted and assimilated by the growing plants will also be of value to the soil by creating a highly porous, aerated, water-absorptive structure therein.

A further object is to provide a soil conditioner and fertilizer which will not destroy the bacteria and worms in the soil, so that they will remain active in converting the chemical elements into soluble salts for use by the growing plants, and so that the bacterial and animal life will continue to maintain the soil porous and absorptive so as to prevent the accumulation of surface water, which might result in erosion.

Other objects and advantages in the improved soil builder, conditioner and fertilizer and in the method of manufacturing the same will become more apparent from the following detailed description in which reference is had to the accompanying drawing which illustrates a diagram or flow sheet showing the various steps employed in the production of the improved soil building and fertilizing compound.

In order to effectively accomplish the above objects, it is necessary to employ a vehicle or base material for carrying the essential chemicals, and this base material must be highly porous so as to absorb and retain a maximum quantity of useful chemicals ready for use throughout the life of the compound.

Certain of the andesitic, basaltic and rhyolitic lavas, including pitchstone, pumice, pumicite, basalt, feldspar, etc., when properly treated, have proved to have excellent soil conditioning characteristics.

Repeated experiments have indicated that one of the most ideal for use as a base for carrying the essential chemical constituents is perlite. Perlite may be defined as the siliceous volcanic glass containing dissolved (magmatic) water in sufficient quantities to expand into bubbles when heated to a point to properly soften the glass. The glass consists of complex, amorphous silicates of aluminum, sodium, and potassium, with occasional iron oxide and other impurities. It is usually opaque to sub-translucent, and ranges from light grey to black in color.

It has been found that if natural perlite is rapidly heated to a point where the moisture content will expand within the heat-softened glass, it will form minute glass bubbles. Rapid cooling will set and fracture these bubbles to form a highly-porous, cellular material which forms an ideal carrier, vehicle or base material for soil fertilizing chemicals. The fractured minute bubbles and the open interstices between the bubbles form minute empty cells for the reception and retention of desired chemicals. Since the cells are uniformly distributed throughout the entire mass of expanded perlite, the chemicals placed in said cells will be uniformly distributed through the entire mass. The cells are substantially insoluble and will retain and protect the contained chemicals so that they will not readily wash away, but will slowly and continuously dissolve into the soil moisture to re-vitalize the soil.

The perlite, in itself, has valuable qualities for the treatment of soil, for due to its light weight, it can be easily and uniformly distributed through the soil and due to its high and permanent porosity, it will retain open cells or pores in the soil so as to evenly and uniformly aerate and maintain the soil in an air-receptive and moisture-receptive condition ideal for plant growth. All packed, plastic, dobe impervious clay conditions are avoided and the hard semi-waterproof top crust with its resulting erosion is eliminated. Thus, even without the contained plant chemicals, the perlite is a valuable soil addition, for it is logical to assume that if a soil is maintained more open, porous or loose, the growing plant will be benefited by the increased aeration and the increased water retention.

It has been found that if, after a solution of the desired chemicals is added to the expanded perlite, the latter is properly dried, the chemicals dry upon the walls of their cells and are entrapped within the latter so as to become a mechanically fixed part of the base material. Thus, they will not be rapidly leached away and will be retained to continuously supply the plant with its food necessities.

The improved soil building and fertilizing compound is prepared by feeding mined perlite through a crusher, as diagrammatically indicated at 10 on the drawing, which is set to crush the material to approximately 8 mesh. The crushed material is screened, as indicated at 11, and the oversize is returned to the crusher, as indicated at 12. The material passing the screen is fed to a rotary kiln 13, preferably of a type having the heat concentrated adjacent the discharge end so that material passing through the kiln will reach its maximum temperature at the point of discharge. The heat required depends upon the particular type of perlite being treated. It has been found that in the usual case, the perlite should be discharged from the kiln at a temperature of from 900° F. to 1450° F.

The perlite is discharged from the kiln into an aqueous solution in a mixing tank 14 provided with a suitable agitator 15. The tank 14 contains a hydrous solution of the various chemical elements or additives desired in the final fertilizer, such as sulphates, nitrates, phosphates, metallic salts, etc. These are fed into the mixing tank 14 from suitable supply bins 16 through proportioning valves 30, and the water is supplied to the tank from a water pipe 18 controlled by a proportioning valve V.

The open pores, cells, bubbles and interstices in the expanded perlite quickly absorb the liquid solution in the tank in excess of 11½ times the weight of the perlite. The perlite, with its absorbed chemicals, is discharged from the mixing tank through a batch valve 20 to a rotary drier 21 which is maintained at a temperature of from approximately 200° F. to 300° F. The time element in the drier is sufficient to evaporate the major portion of the water from the perlite and leave the chemical salts attached to and dried within the cells of the material. The fine fraction of the dried material is then fed to a compositing vat 22 provided with a mechanical agitator 23 thence to any suitable pelletizer or granulating machine, such as indicated at 24, and thence is fed to a sacker 25 which places it in suitable sacks or bags 26 which are conveyed to storage, as indicated at 27, until needed for use in the field.

The additives will be proportioned percentagewise as to the soil requirements of the area to be fertilized, this determination being made from the soil tests; however, the basic constituents, nitrogen, potash and phosphate, while varying with the soil need, will be in the main a total of 20% of the weight. To these will be added soluble magnesium, manganese, iron, sulphur, cobalt, boron, copper, zinc, molybdenum, and such trace and necessary elements as are desired to complete the plant food.

The percentages of these elements will vary with the plant's need, but will be so admixed as to contain a minimum of the metals as follows:

|  | Percent |
|---|---|
| Molybdenum | .01 |
| Nitrogen } Potash } Phosphate } | .20 |
| Copper | .05 |
| Cobalt | .001 |
| Zinc | .5 |
| Sulphur | 5.00 |
| Boron | .10 |
| Manganese | .10 |
| Magnesia | 3.00 |
| Iron | .10 |
| Peat moss | 15.00 |
| Carbonaceous shale | 15.00 |

Soils in some areas are deficient in humus. To correct such soils, it is therefore necessary to add organic material and soil bacteria. This is accomplished in the present invention, when necessary, by mixing the dried activated perlite from the drier 21 with a compost of organic materials, such as peat moss, carbonaceous shale, etc., as indicated at 28 on the flow sheet, to which, if necessary, live beneficial soil bacteria has been added, as indicated at 29, in the compost mixer 22. The mixing is carried out at room temperature to avoid injury to the bacteria.

The final result is custom-made soil builder and fertilizer which will replace in proper proportion all of the organic and inorganic elements in the soil.

The bulk of the final material is much greater than the original perlite fed into the crusher, due to its expansion in the kiln, and the dried chemical salts therein add but little weight so that the cost of shipping is reduced to a minimum.

It has been found that in many of the metal mine and mill dumps in the Rocky Mountain Region many or all of the necessary additives for the mixing tank 14 are contained in the discarded gangue and tailings in the dumps so that the expense of purchasing individual chemical salts can be greatly reduced by simply crushing and feeding the mill wastes into the mixing tank with the expanded perlite.

The weight of the carrier material can be controlled entirely by the temperature and furnace control, and the size of the carrier material will depend entirely upon the use to which it is to be put. That is, the weight can be from 4 pounds to 30 pounds per cubic foot. If the end product is to be used for soil dressing, a minimum weight of approximately 20 pounds to the cubic foot will be desired so that it will readily feed from a fertilizer applicator. If the end product is to be used for crop dusting, then a weight of approximately 6 pounds minimum to the cubic foot will be desired.

The cellular character of the carrier material will not readily leech away, but will entrap moisture and air, thereby aerating the soil. It is especially beneficial to plastic or adobe soils and remains within any soil for several years, thereby giving the soil the desirable tilth and structure, and with the plant foods added will make a complete soil conditioner and fertilizer.

It also tends to neutralize alkaline and acid soils and with its slow break-down acts as a catalyst in converting organic (humus) materials and minerals into soluble salts so that the growing plant can assimilate them as food. In aerating the soil, it permits the full development of the plant life (soil bacteria) and animal life (earthworm) within the soil, which helps to bring the soil to full fertility and from which all growing things will grow in abundance. It is highly beneficial for mulching and plant food for orchards, lawns, gardens, potted plants, flower beds, etc.

The absorptive powers of the expanded perlite can also be utilized for absorbing insecticide solutions and, when ground to minus 300 mesh, makes an ideal plant dusting medium which will cling to the leaves and slowly release the contained insecticide over a long period of time.

The term "soil conditioner" as used herein includes both soil building and soil fertilizing, either combined or individually.

While a specific form of the invention has been described in some detail together with the theories which it is believed to best explain its function, it is to be understood that the invention is not limited to the precise procedure described nor is it dependent upon the accuracy of the theories which have been advanced. On the contrary, the invention is not to be regarded as limited except insofar as possible limitations are included within the terms of the accepted claims in which it is the intention to claim all novelty inherent in the invention as broadly as is permissible in view of the prior art.

Having thus described the invention, what is claimed and desired secured by Letters Patent is:

1. A method of manufacturing a soil conditioning compound comprising: expanding perlite under the influence of heat; discharging the expanded perlite into an aqueous solution; adding inorganic salts containing nitrogen, potash, and phosphate to said solution; agitating the solution; discharging the solids from said solution to a dryer; drying the solids sufficiently to cause the salts of the solution to precipitate upon and to adhere to the surfaces and in the interstices of the perlite particles; discharging the perlite with the adhering dried salts to a mixer; adding organic soil conditioning ingredients to said mixer; mixing the perlite with the adhering dried salts with the organic ingredients; thence discharging the perlite with the intermixed organic material and adhering dried salts as a soil conditioning compound.

2. A method of producing a soil conditioning compound comprising heating particles of perlite to expand the same and form interstices therein; agitating the expanded particles in contact with a hydrous solution of fertilizer ingredients consisting of sulphates, nitrates, phosphates and metallic salts; drying the particles so as to cause the fertilizer ingredients in the aqueous films clinging to the expanded surfaces of the particles and within the interstices thereof to firmly adhere thereto; mixing the dried particles with organic soil conditioning ingredients; and pelletizing the mixture into discrete pellets.

3. A method of producing a soil conditioning compound comprising heating particles of perlite to expand the same and form interstices therein; agitating the expanded particles in contact with a hydrous solution of fertilizer ingredients consisting of sulphates, nitrates, phosphates and metallic salts; drying the particles sufficiently so as to leave a coating of the fertilizer ingredients firmly adhering to the expanded surfaces and within the interstices of the particles; mixing the dried particles with organic soil conditioning ingredients; and pelletizing the mixture for bagging and storage.

References Cited in the file of this patent

UNITED STATES PATENTS

| | | |
|---|---|---|
| 1,399,660 | Saves | Dec. 6, 1921 |
| 2,341,800 | Martin et al. | Feb. 15, 1944 |
| 2,421,902 | Neuschotz | June 10, 1947 |
| 2,602,782 | Zoradi | July 8, 1952 |
| 2,669,510 | Dresser | Feb. 16, 1954 |

FOREIGN PATENTS

| | | |
|---|---|---|
| 9,219 | Australia | Sept. 16, 1932 |

OTHER REFERENCES

Perlite—The Wonder Material, Converter Company, 710 North Cogswell Road, El Monte, Calif. (pages 1–12).